(12) United States Patent
Chatani

(10) Patent No.: US 8,024,420 B2
(45) Date of Patent: Sep. 20, 2011

(54) CONTENT DELIVERY APPARATUS AND SYSTEM

(75) Inventor: Masayuki Chatani, Tokyo (JP)

(73) Assignee: Sony Computer Entertainment Inc. (JP)

( * ) Notice: Subject to any disclaimer, the term of this patent is extended or adjusted under 35 U.S.C. 154(b) by 1021 days.

(21) Appl. No.: 11/451,668

(22) Filed: Jun. 13, 2006

(65) Prior Publication Data

US 2007/0005722 A1    Jan. 4, 2007

(30) Foreign Application Priority Data

Jun. 13, 2005  (JP) ................................ 2005-172958

(51) Int. Cl.
G06F 15/16 (2006.01)
H04N 7/16 (2006.01)
(52) U.S. Cl. ........................ 709/217; 725/141; 725/10
(58) Field of Classification Search .................. 725/141, 725/10; 709/217
See application file for complete search history.

(56) References Cited

U.S. PATENT DOCUMENTS

| | | | | |
|---|---|---|---|---|
| 2002/0022475 A1* | 2/2002 | Tsuneki et al. | ............... | 455/412 |
| 2004/0158565 A1* | 8/2004 | Kakuta et al. | .................. | 707/10 |
| 2004/0210117 A1* | 10/2004 | Ueno et al. | .................... | 600/300 |
| 2005/0149751 A1* | 7/2005 | Ochi et al. | ..................... | 713/200 |
| 2006/0005226 A1* | 1/2006 | Lee | ................ | 725/141 |
| 2006/0140580 A1* | 6/2006 | Hiroi et al. | ...................... | 386/52 |
| 2006/0143647 A1* | 6/2006 | Bill | ................. | 725/10 |
| 2006/0212542 A1* | 9/2006 | Fang et al. | ..................... | 709/219 |
| 2006/0253451 A1* | 11/2006 | Van De Sluis et al. | ......... | 707/10 |
| 2007/0033329 A1* | 2/2007 | Sinclair et al. | ................ | 711/103 |
| 2007/0270664 A1* | 11/2007 | Ishii et al. | ..................... | 600/300 |
| 2007/0277196 A1* | 11/2007 | Steengaard et al. | ............ | 725/37 |

FOREIGN PATENT DOCUMENTS

| | | |
|---|---|---|
| JP | 2001-282847 A | 10/2001 |
| JP | 2002-374512 A | 12/2002 |
| JP | 2004-246535 A | 9/2004 |
| JP | 2005-032167 A | 2/2005 |
| JP | 2005-056205 A | 3/2005 |

OTHER PUBLICATIONS

Office Action from Japanese Application No. 2005-172958 dated Sep. 14, 2010.
Office Action issued for corresponding Japanese Patent Application No. 2005-172958 dated Jun. 21, 2011.

* cited by examiner

*Primary Examiner* — Andrew Caldwell
*Assistant Examiner* — Taylor Elfervig
(74) *Attorney, Agent, or Firm* — Lerner, David, Littenberg, Krumholz & Mentlik, LLP

(57) ABSTRACT

A mental and physical condition analyzer analyzes the mental and physical condition of a user based upon measurement data transmitted in association with a delivery request from a terminal and related to the mental and physical of the user of the terminal. A content selector selects content adapted to the mental and physical condition of the user. An output unit outputs the content selected by the content selector.

20 Claims, 11 Drawing Sheets

FIG.4

| ANALYZED INFORMATION | | | | MENTAL AND PHYSICAL CONDITION |
|---|---|---|---|---|
| MEASUREMENT DATA | PULSE RATE | BODY TEMPERATURE | HUMID- ITY | |
| | FAST | LOW | | TIRED |
| | FAST | HIGH | | EXCITED |
| | | | 70% | RAIN |
| DATE AND TIME OF DELIVERY REQUEST | Y/M/D/T | BIRTHDAY | | DELIGHTFUL |
| | Y/M/D/T | MONDAY MORNING | | NOT MOTIVATED |
| | Y/M/D/T | WEEKDAY EVENING | | TIRED |
| | Y/M/D/T | HOLIDAY | | RELAXED |

FIG.6

| No. | FILE NAME | MEDIA TYPE | FORMAT | PLAYBACK SIZE | MEMORY SIZE | GENRE | ATTRIBUTE | PREVIOUS DELIVERY DATA | NUMBER OF TIMES DELIVERED |
|---|---|---|---|---|---|---|---|---|---|
| 1 | flower001 | STILL IMAGE | jpg | 640 × 480 | 85KB | NATURE | HEALING | 2005/2/21 | 4 |
| 2 | classic003 | MUSIC | mp3 | 12 MINUTES 25 SECONDS | 13MB | CLASSICAL | MOTIVATING | 2005/3/3 | 1 |
| 3 | pop001 | MUSIC | mp3 | 14 MINUTES | 14MB | POPS | RHYTHMICAL | 2005/4/3 | 3 |
| 4 | film003 | MOVING IMAGE | mpg | 320 × 240 × 180 SECONDS | 54MB | FAMILY MOVIE | RELAXING | 2004/11/15 | 2 |
| ... | ... | ... | ... | ... | ... | ... | ... | ... | ... |

| GENERAL TENDENCY TABLE ||
|---|---|
| CONDITION | ATTRIBUTE |
| TIRED | HEALING, RELAXING |
| DELIGHTFUL | RHYTHMICAL, RADICAL |
| NOT MOTIVATED | MOTIVATING, HEALING |
| RAIN | RELAXING, NOSTALGIC |
| ⋮ | ⋮ |

Figure 8:
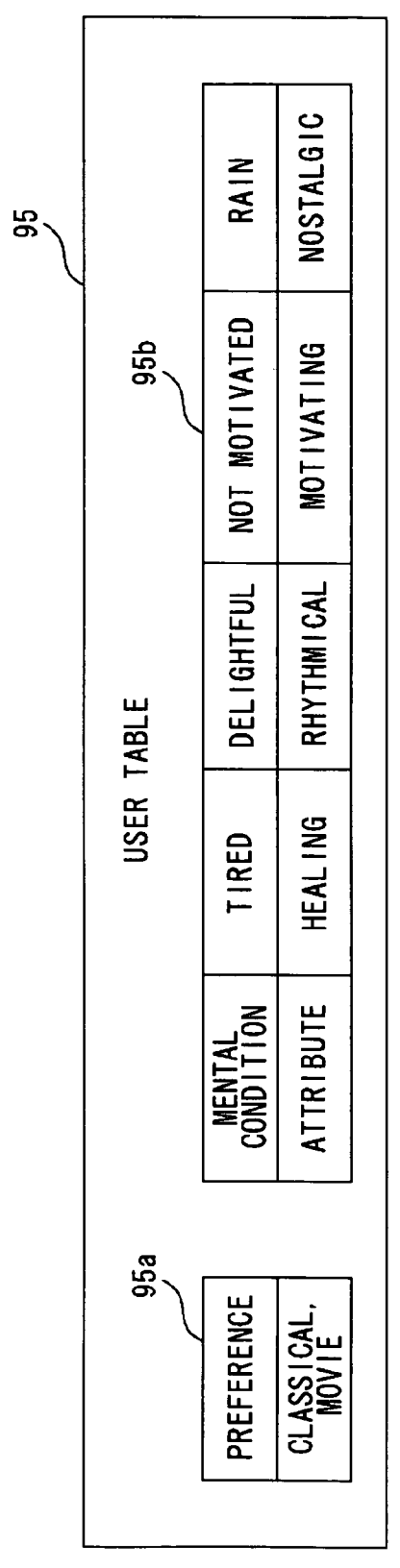

| | 95a | | 95b | | |
|---|---|---|---|---|---|
| | PREFERENCE | MENTAL CONDITION | | | |
| ATTRIBUTE | CLASSICAL, MOVIE | TIRED | DELIGHTFUL | NOT MOTIVATED | RAIN |
| | | HEALING | RHYTHMICAL | MOTIVATING | NOSTALGIC |

USER TABLE 95

CONTENT DELIVERY APPARATUS AND SYSTEM

CROSS-REFERENCE TO RELATED APPLICATIONS

The present application claims priority from Japanese Patent Application No. JP 2005-172958 filed on Jun. 13, 2005, the disclosure of which is hereby incorporated by reference herein.

BACKGROUND OF THE INVENTION

The present invention relates to a content delivery apparatus and a content delivery system for delivering contents to terminals.

Recently, services which deliver digitized contents such as sound and images to users' terminals over a network have become very popular. Various systems are proposed to better serve users' needs.

For example, Japanese published Application No. JP 2002-374512 describes a system which registers profiles describing users' preferences. Video digests adapted to the preferences are delivered upon a delivery request from a user so that an original video from which a selected video digest is derived is delivered.

Users who like radical music bands may not necessarily prefer radical music depending on physical and mental conditions. Conversely, users who usually like soft music may be interested in more or less heavy music from time to time.

SUMMARY OF THE INVENTION

A general purpose of the present invention is to provide a content delivery apparatus and a content delivery system capable of delivering content adapted to the condition which a user is in.

A content delivery apparatus according to one embodiment of the present invention includes user condition information obtaining means which obtains user condition information indicating a condition of a user of a terminal in response to a delivery request from the terminal; content selection means which refers to the user condition information and selects content adapted to the condition of the user indicated by the user condition information; and delivery means which delivers the selected content to the terminal.

The content delivery apparatus may further include a database which stores contents in association with properties that people who enjoy the contents generally associate with the contents, wherein the content selection means refers to the user condition information and a general tendency of users and selects from the database the content having a property adapted to the condition of the user indicated by the user condition information.

A content delivery apparatus according to another embodiment of the present invention includes content selection means which selects content in response to a delivery request from a terminal; delivery means which delivers the selected content to the terminal; a database which stores contents in association with properties that people who enjoy the contents generally associate with the contents; a user condition information obtaining means which obtains user condition information indicating a condition of a user of the terminal in response to the delivery request; and a learning means which stores the user condition information obtained by the user condition information obtaining means in association with the properties of the contents delivered by the delivery means in response to the delivery request.

The content selection means accepts content designation information entered by the user of the terminal in response to a delivery request corresponding to user condition information not stored in relation to the user of the terminal, whereupon the content selection means selects the content designated by the content designation information. The content selection means selects from the database content having a property corresponding to the condition of the user as indicated by the user condition information stored in the learning means in response to a delivery request corresponding to the user condition information stored by the learning means in relation to the user of the terminal.

The content delivery apparatus according to the one embodiment obtains the user condition information of the user of the terminal when there is a delivery request from the terminal and delivers content adapted to the condition indicated by the user condition information. The content delivery apparatus according to the another embodiment also obtains the user condition information of the user of the terminal when there is a delivery request from the terminal. The difference is that the content delivery apparatus according to the another embodiment includes learning means which stores what kind of content is personally preferred by the user in different conditions. Different processes are performed depending on whether the user condition information obtained in association with the delivery request has been stored by the learning means in relation to the user requesting delivery. In the case of user condition information that has not been stored, i.e., if delivery to the user has not been performed when the user is in the condition indicated by the user condition information, the content delivery apparatus according to the another embodiment delivers content designated by the user, and the learning means stores, in relation to user, the user condition information in association with the property of the delivered content. In the case of user condition information that has been stored by the learning means, i.e., if delivery to the user has been performed when the user is in the condition indicated by the user condition information, and if the learning means stores the property of the content delivered to the user in association with the user condition information, the content delivery apparatus according to the another embodiment selects content having the property corresponding to the user condition information and delivers the same.

The condition of the user may be one or both of the user's physical condition and mental condition.

The user condition information may directly or indirectly indicate the mental and physical condition. Any information serves the purpose as long as it indicates the mental and physical condition of the user. For example, when the user is in a quiet place, the user tends to feel peaceful. The user may feel delighted in an amusement part and irritated in a humid condition. Thus, some types of external environments which people are in (e.g., weather condition, places, etc.) are related to the mental and physical condition of people. These types of external environments may be examples of user condition information indirectly indicating the user's mental and physical condition.

The term "content" may refer to content itself. Alternatively, the term may refer to content information, such as link information, indicating the location storing a selected content, which ultimately makes it possible to deliver the content selected by the aforementioned content delivery apparatus to the terminal.

Optional combinations of the aforementioned constituting elements, and implementations of the invention in the form of systems, programs and storage mediums storing programs, may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIG. 4 shows a mental and physical condition analyzer in the home server shown in FIG. 2;

FIG. 6 shows an example of a content management table included as an item of storage shown in FIG. 5;

FIG. 7 shows an example of a general tendency table included as an item of storage shown in FIG. 5;

FIG. 8 shows an example of a user table included as an item of storage shown in FIG. 5;

DETAILED DESCRIPTION OF THE INVENTION

Figure 1:
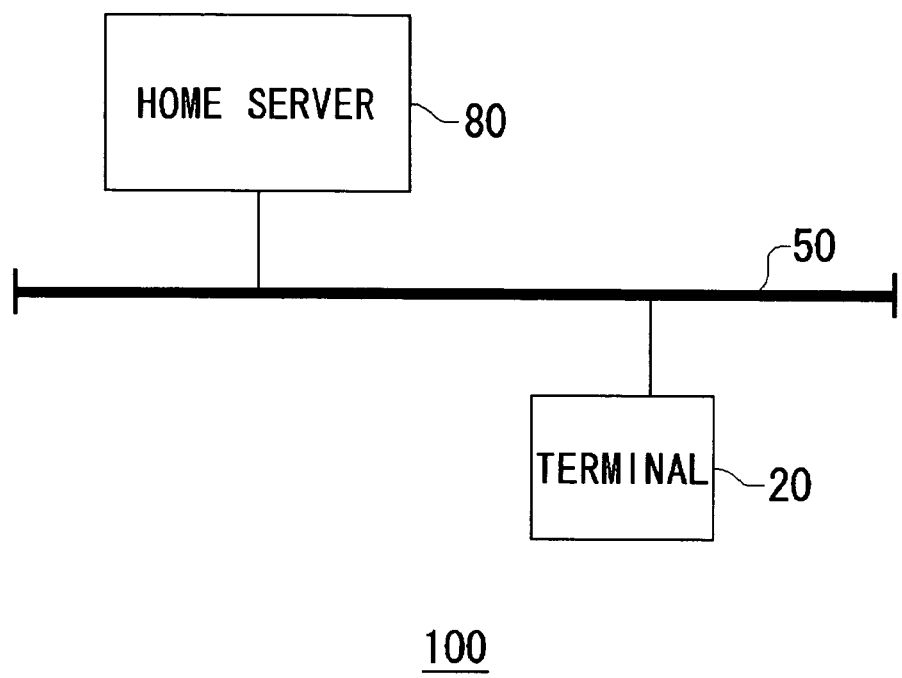
FIG. 1 shows the structure of a delivery system according to an embodiment of the present invention.

The invention will now be described by reference to the preferred embodiments. This does not intend to limit the scope of the present invention, but to exemplify the invention.

Contents like images and sound affect the human mind and body. People generally associate contents with such properties as "active," "rhythmical," "passionate," "nostalgic" and "healing."

The types of contents that a user benefits from and enjoys may differ depending on the condition (i.e., mental condition or physical condition) which the user is in. Contents that the user feels like enjoying also differ depending on the condition. Thus, different contents are adapted to different mental and physical conditions. The phrase "adapted to" refers to a situation in which the property of content matches the user's mental and physical condition or a situation in which the property of content is similar in quality to the mental and physical condition, but the phrase may also encompass other situations. For example, "rhythmical" is a property that gives cheerfulness and buoyancy. As such, it would have the same quality as the mental condition of "delightful." Users in a "delightful" condition may generally feel good by listening to music having an attribute of "rhythmical." Therefore, it can be said that music having an attribute of "rhythmical" is adapted to such a condition. In contrast, a comedy movie does not invoke sadness itself but it may alleviate sadness by viewing it and as such is adapted to a condition of sadness.

We propose a technology for delivering contents adapted to users' mental and physical conditions from two perspectives.

The first technology focuses on the fact general correspondence common to a large number of users can be established between the mental and physical condition of a user and the content adapted to the condition. For example, when one is tense, listening to healing music eases the tension. When one is delightful, one would like to listen to rhythmical music. In this technology, when there is a delivery request from a terminal, user condition information indicating the mental and physical condition of a user of the terminal is obtained. Content having a property adapted to the mental and physical condition indicated by the user condition information is selected by referring to the user condition information and delivered, based upon the general tendency common to users. According to this technology, the general tendency among users is referred to in selecting content. Therefore, contents adapted to the mental and physical conditions can be delivered to a large number of users.

The second technology focuses on the fact that correspondence between the mental and physical condition and the property of a suitable content differs slightly from user to user. In this technology, user-specific correspondence between the mental and physical condition and the property of content adapted to the condition is obtained. Delivery to individual users is performed by referring to the user-specific correspondence.

One possible approach to obtain the user-specific correspondence may be to allow a user to manually register the correspondence such as "sad: comedy movie" and "rainy days: jazz." This would be time consuming and bothersome to the user. Also, it is often unrealistic to predict and register correspondence because the user may not know what type of content is desirable until the user is in the condition.

In the technology we propose, correspondence is obtained by providing a learning means in a content delivery apparatus. More specifically, when the user is in a mental and physical condition for which correspondence is unknown, the system allows a user to specify a desired content so that the specified content is delivered to the user. The learning means stores the property of the content delivered and the mental and physical condition in relation to each other. When there is a delivery request later from the user in the mental and physical condition learned, delivery is performed by referring to the correspondence learned by the learning means.

The learning means stores the property of the content delivered and the concurrent user condition information in relation to each other. When there is a delivery request, the content delivery apparatus obtains the user condition information indicating the mental and physical condition of the user of the terminal. The apparatus further determines whether the learning means has learned the user condition information thus obtained in relation to the user. Whether the learning means has learned is equivalent to whether delivery has occurred in the past when the user is in the mental and physical condition indicated by the user condition information currently obtained. If the user condition information obtained when there is a delivery request has not been learned, the content delivery apparatus accepts an input from the user specifying a desired content, whereupon the content delivery apparatus delivers the specified content, and the learning means learns the correspondence. If the user condition information obtained when there is a delivery request has been learned in relation to the user, the property corresponding to the user condition information is obtained from the learning means so that content having the property thus obtained is delivered. According to this technology, selection of content is made with reference to user-specific preferences so that personalized delivery is achieved.

In the second technology, it is preferable that a user can select content even if the user condition information has been learned. This permits the system to learn results of several selections made in a given user's condition. It is thus possible to deliver content more properly adapted to the user's preference in a learning-based approach. For example, content of a property most frequently selected in a given condition may be delivered. If the user's preference has changed recently, it may be known by learning that content of a property different from that previously selected in the same condition is frequently selected over a predetermined period in the immediate past.

The number of times that correspondence is learned may be predefined. For example, learning-based delivery may be performed only when delivery according to the user's selection is performed three times for a given situation.

The two technologies represent basic ideas for achieving the purpose of delivering content in accordance with the user's mental and physical condition. The technologies may be practiced independently or in combination. When practiced in combination, the first technology may be employed to present to a user multiple candidates of content that cover a relatively broad range representing general tendency among users. The second technology is then employed, allowing the user to select content to be delivered from the candidates thus presented. The content selected by the user is delivered. The property of the content delivered and the user condition information are learned and stored in relation to each other. When the user condition information thus learned is obtained subsequently in relation to this user, content corresponding to the user condition information is selected and delivered. The combination of technologies allows the user to select content from a relative narrow range of candidates, putting less strain on the user. Since the content is selected with reference to the user-specific tendency before being delivered, content delivery adapted to the user's mental and physical condition is ensured.

The aforementioned technology may be combined with the related-art technology. For example, the user's mental and physical conditions may largely be categorized into "normal" and "not normal." While there is only one type of condition under the category of "normal," there are multiple types of conditions such as "excited" and "sad" under the category of "not normal." The user's preference is registered in advance. If the user condition information obtained when there is a delivery request indicates a "normal" mental and physical condition of the user, content adapted to the preference is delivered as the content adapted to the mental and physical condition categorized as "normal." If the user's mental and physical condition is "not normal," a suitable content is delivered in accordance with the mental and physical condition which is "not normal."

In delivering a suitable content on the basis of a type of mental and physical condition which is "not normal," only the type of mental and physical condition may be referred to in order to deliver a suitable content irrespective of the user's preference. Alternatively, selection may be made from contents adapted to the user's preference so as to choose and deliver content adapted to the mental and physical condition. Alternatively, content adapted to the user's preference may be selected as part of the content delivered. For the other parts, contents adapted to the type of "not normal" mental and physical condition may be selected irrespective of the user's preference.

A description will now be given of an embodiment of the present invention with reference to the attached drawings.

FIG. 1 shows a delivery system 100 according to the embodiment. With the advance in semiconductor technology in recent years, functions of cell phones have become so improved that they are now capable of playing back contents like moving images as well as still images and music. The constraints imposed on the capacity of a storage medium in a cell phone require that a large amount of content be archived in a home server so that a required amount of content is downloaded from the home server to a cell phone terminal for use away from home. The user may connect a cell phone to a home server before going to work in the morning when he or she wishes to download thereto content to enjoy on the way to work. In this process, it saves trouble to the user if the home server is capable of automatically selecting content adapted to the user's feelings and physical condition and delivering it to the cell phone. While the content is being delivered, the user may do other things like getting ready to go out, and so there is no need to spend busy hours in the morning selecting content.

The delivery system shown in FIG. 1 addresses such a need and is designed to deliver content from a home server 80, which is a server at home, to a terminal 20. A network 50 (for example, local area network (LAN)) connects the home server 80 and the terminal 20. Any type of network suffices as long as it is capable of connecting the home server 80 to the terminal 20 and dealing with data transmission and reception. Any interface, such as BlueTooth (short range wireless communication), USB or IEEE1394, may be used for connection.

The terminal 20 may be a personal computer (PC), a personal digital assistant (PDA), a cell phone or a game device connectable to the network 50 or other arbitrary hardware. In this example, the terminal 20 is represented by a cell phone since we assume a form of use in which content is obtained from the home server 80 for use away from home.

Figure 2:
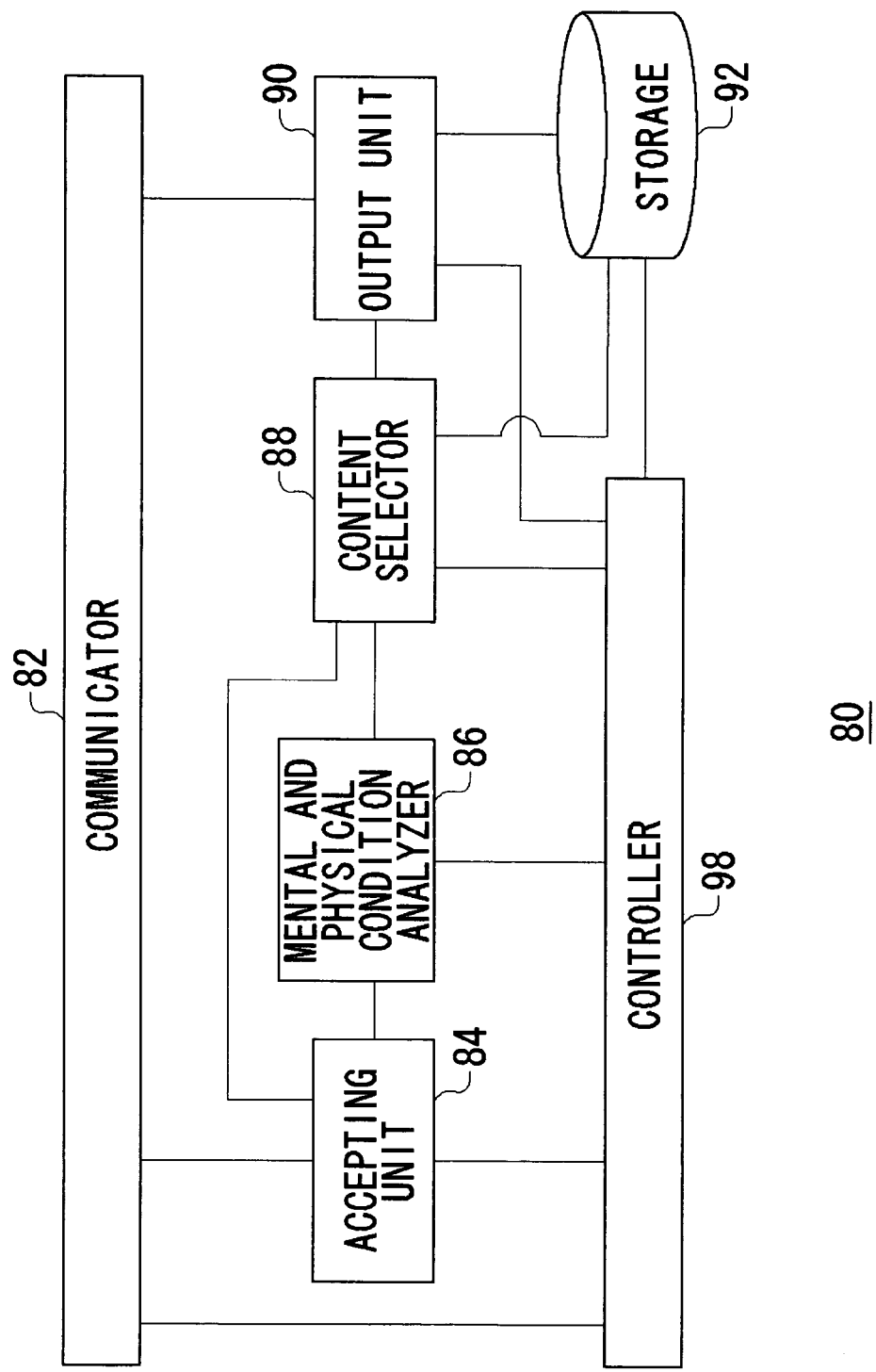
FIG. 2 shows the structure of a home server in the delivery system shown in FIG. 1.

FIG. 2 shows the structure of the home server 80. The home server 80 is provided with a communicator 82, an accepting unit 84, a mental and physical condition analyzer 86, a content selector 88, an output unit 90, a storage 92 and a controller 98 controlling these components. The structure is implemented by running a program for processing delivery of content to the terminal 20 on a computer (for example, work station, PC, etc.). The program may be stored in a storage medium such as a CD-ROM or distributed over a network such as the Internet and installed in a computer.

The communicator 82 is a network interface for communication between the home server 80 and the terminal 20. The accepting unit 84 presents various menus to the terminal 20 and accepts various inputs from the terminal 20. The mental and physical condition analyzer 86 analyzes the mental and physical condition of a user of the terminal 20 when there is a delivery request from the terminal 20, as described later. The content selector 88 selects content to be delivered to the terminal 20 from the storage 92. The output unit 90 transmits the content selected by the content selector 88 to the terminal 20 via the communicator 82. These processes are performed under the control of the controller 98. Transmission to and reception from the terminal 20 is performed via the communicator 82.

In response to a delivery request from the terminal 20, the accepting unit 84 accepts measurement data, the details of which will be described later, transmitted from the terminal 20 in association with the delivery request and outputs the same to the mental and physical condition analyzer 86. The accepting unit 84 then presents a selection menu shown in FIG. 3. The timing associated with the occurrence of a delivery request may be determined by a system design. For example, a determination that a delivery request occurs may be made when the terminal 20 connects to a delivery site, when the user of the terminal 20 completes a log-in procedure or when the measurement data is received. Since the system is for home use, a determination that a delivery request occurs may only require connection from the terminal 20 and does not require a procedure such as log-in.

Figure 3:
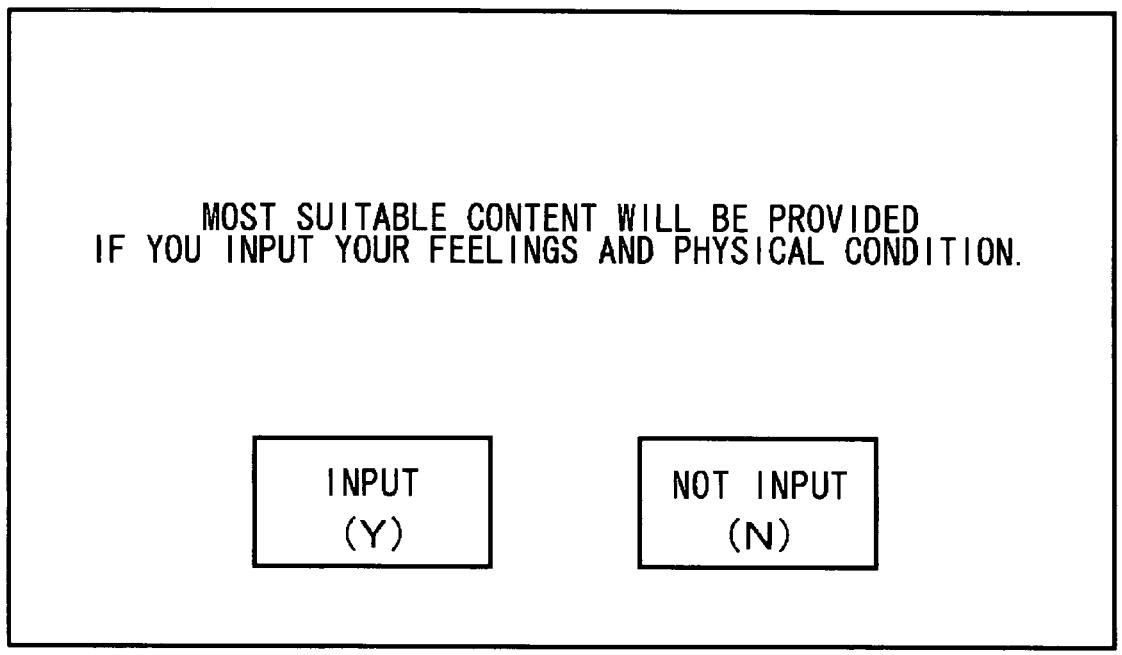
FIG. 3 shows an example of a selection screen presented by the home server shown in FIG. 2.

FIG. 3 shows an example of a selection menu presented by the accepting unit 84. On the display screen, the user of the terminal 20 selects whether or not to input the user's feelings and physical condition. If the user selects "input," the accepting unit 84 accepts the mental and physical condition that the user inputs subsequently and outputs the same to the mental and physical condition analyzer 86. If the user selects "not input," the accepting unit 84 no longer shows the screen of FIG. 3.

The accepting unit 84 additionally accepts the remaining capacity of the storage medium of the terminal 20 and machine type information of the terminal 20 as transmitted from the terminal 20 and transmits this information to the content selector 88.

If the user selects "not input" in the selection screen shown in FIG. 3, the mental and physical condition analyzer 86 analyzes the mental and physical condition of the user. The mental and physical condition analyzer 86 analyzes the mental and physical condition by referring to the measurement data transmitted from the terminal 20 and the date and time when the delivery request is sent. The measurement data may include, for example, pulse rate, body temperature and humidity. In the following description, these three items of measurement data will be used as examples. The mental and physical condition analyzer 86 determines that the user is in an "excited" condition when learning that the pulse rate and body temperature exceed predetermined thresholds showing that the user "has a fast pulse rate and high body temperature." If the user "has a fast pulse rate and low body temperature," the analyze 86 determines that the user is "tired." If the pulse rate and body temperature are within normal ranges, the analyzer 86 determines that the user is in a "normal" condition. If the humidity exceeds a predetermined threshold, the analyzer 86 determines that it is a rainy day.

The mental and physical condition analyzer 86 also analyzes the mental and physical condition based on the date and time of the delivery request. For example, some correspondence is established between the date and time and the condition that people are likely to be in at the date and time. For example, people may be less motivated on Monday morning and tired on weekday evenings. When a date and time is associated with an event, the type of event may affect the mental and physical condition. An event may not be limited to a general event such as a holiday but may be a user-specific personal event such as a birthday and a payday. A general event may be known by providing the home server 80 with a calendar function and need not be registered. User-specific personal events may be registered by the user. Registration of events may not be performed solely for the purpose of content delivery. For example, the mental and physical condition analyzer 86 may obtain the events from the user's schedule registered by the schedule management function provided in the home server 80. The mental and physical condition analyzer 86 is provided with a database storing the date and time in association with the condition that people are likely to be in (not shown); and a database storing the date and time in association with the event corresponding thereto. By searching the databases using the date and time of the delivery request as a key, the mental and physical condition analyzer 86 estimates a condition in which people are likely to be in at that date and time and also estimates the mental and physical condition of the user based upon the type of event corresponding to the date and time (e.g., the user must be "delighted" because it is the user's "birthday").

The mental and physical condition analyzer 86 may obtain multiple mental and physical conditions. If the multiple mental and physical conditions do not match, the mental and physical condition analyzer 86 may determine the mental and physical condition from an analysis result by assigning priority in the following order: information obtained from the user's body and included in the measurement data (in this case, pulse rate and body temperature); a personal event; a condition which people are likely to be in at that date and time; information included in the measurement data and indicating the external environment (in this case, humidity); and a general event. These items of information may generically be referred to as analyzed information. An analysis result indicating a "normal condition" is excluded. For improved efficiency of analysis, the analyzed information is used for analysis in the order of priority stated above and, when a result of analysis indicating a condition other than "normal" is obtained, the mental and physical condition of the user is determined, whereupon analysis using the information with lower priority may be terminated.

The storage 92 will be described before describing the content selector 88.

Figure 5:
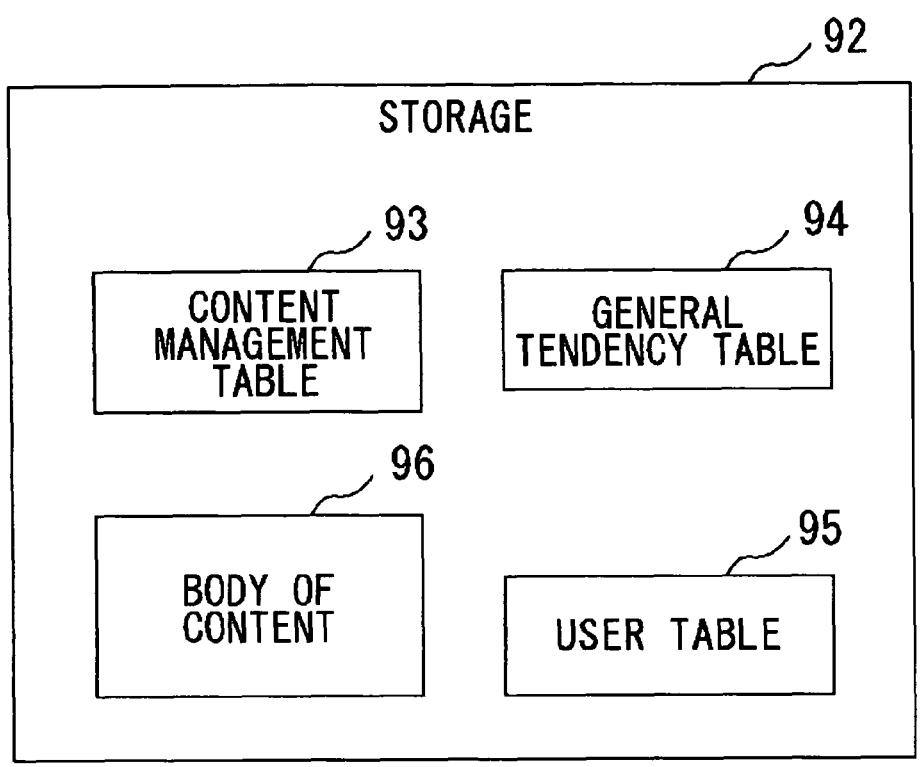
FIG. 5 shows items stored in a storage in the home server.

FIG. 5 shows items stored in the storage 92. The storage 92 stores a content management table 93, a general tendency table 94, a user table 95 and a body of content 96.

The body of content 96 represents the body of various contents archived in the home server 80 and the associated file names.

FIG. 6 shows an example of the content management table 93. The content management table 93 stores the "file name," "media type," "format," "playback size," "memory size," "genre," "attribute" and delivery history of each content in association with each other, the delivery history comprising "previous delivery date" and "number of times delivered."

"Media type" indicates the media type of content such as still image, music, moving image or the like.

"Format" indicates the file format of content, and "memory size" indicates the capacity required to store content in a storage medium.

"Playback size" indicates the size of content as it is played back. The "playback size" is represented in adaptation to the media type. For example, the "playback size" of a still image, music and a moving image is represented by "number of vertical and horizontal pixels," "playback time" and "number of vertical and horizontal pixels+playback time," respectively.

"Genre" indicates the category of content. The types of genres encompassed may differ from one media type to another. For example, the genres of still images may be nature, archaeological site, famous paintings, contemporary art, family, animation, etc., by way of examples. The genres of moving images may be movie, vehicle, family movie, etc. The genres of music may be classical, pops, hit chart, sound effect, etc.

"Attribute" is a property that a person enjoying content generally associates with the content. For example, a person may feel "healing," "motivating," "relaxing" or "scary." The attribute may be manually entered by a person registering content in the home server 80. Alternatively, the home server 80 may be provided with a content attribute analyzing means for automatic content analysis which analyzes the attribute of content by, for example, referring to the rhythm of music.

The delivery history comprises "previous delivery date" and "number of times delivered" of each content delivered by the output unit 90 in the past.

FIG. 7 shows an example of the general tendency table 94 which lists general tendency by storing correspondence between mental and physical conditions of a person and attributes of contents adapted to the mental and physical condition. General tendency may be obtained as a result of statistical analysis of questionnaires returned or supplied by a psychological researcher. In this embodiment, it is preferable that the second most suitable attribute be stored in the general tendency table 94 in addition to the most suitable attribute. The content type adapted to the "normal" mental and physical condition depends largely on the user's preference and character. Therefore, the general tendency table 94 does not contain an attribute corresponding to the "normal" mental and physical condition.

FIG. 8 shows an example of the user table 95. The user table 95 includes a preference table 95a and a learning table 95b. The preference table 95a stores genres that the user prefers. The genres may be registered by the user. The learning table 95b stores the attributes of contents delivered when the user was not in the "normal" mental and physical condition in association with the mental and physical conditions of the user occurring when the content was delivered. Hereafter, the mental and physical condition included in the learning table 95b will be referred to as a learned mental and physical condition and that which is not will be referred to as a mental and physical condition not learned.

The content selector 88 selects content to be delivered based upon the mental and physical condition entered after the user selects "input" on the screen shown in FIG. 3; the mental and physical condition obtained by the mental and physical condition analyzer 86 after the user selects "not input" on the screen shown in FIG. 3; the remaining capacity of the storage medium of the terminal 20 transmitted from the terminal 20 when there is a delivery request; machine-specific information of the terminal 20; the user table 95, the general tendency table 94, or the content management table 93 stored in the storage 92.

The content selector 88 is provided with a database (not shown) storing the machine types of terminals and the media types playable by the machine types. The content selector 88 identifies information indicating the media type playable by the terminal 20 on the basis of the machine type information transmitted from the terminal 20.

In selecting content using the mental and physical condition of the user received from the accepting unit 84 or the mental and physical condition analyzer 86, the content selector 88 determines whether the mental and physical condition is "normal;" or other than "normal." If the mental and physical condition is "normal," the content selector 88 selects the content as described below.

1. The content selector 88 refers to the preference table 95a and the content management table 93 and selects content of a media type playable by the terminal 20 from those contents associated with the genre preferred by the user, and obtains the file name of the selected content.

2. In order to reduce the frequency of duplicate delivery, the content selector 88 refers to the delivery history included in the content management table 93 in selecting content. Priority is given to the contents not yet delivered. That is, contents less frequently delivered or contents with older delivery dates are given priority in selection.

3. Further, contents are selected so that the total memory size of the content fits within the remaining capacity of the storage medium of the terminal 20 accepted by the accepting unit 84.

The total memory size of the content means the total memory size required for the terminal 20 to store the delivered content in the storage medium. If the content is compressed before being delivered, the total memory size represents the total memory size after the compression.

The content selector 88 transmits the file name of the content thus selected to the output unit 90.

The output unit 90 reads, from the body of content 96, the content with the file name output from the content selector 88 and transmits the same to the terminal 20 via the communicator 82. Associated with the output from the output unit 90, the controller 98 causes the content management table 93 to be updated. More specifically, the delivery history included in the content management table 93 is updated. This completes the process related to the current delivery request.

If the mental and physical condition of the user is other than "normal," the content selector 88 refers to the learning table 95b to determine whether the mental and physical condition has been learned. Referring to the learning table 95b shown in FIG. 8, the conditions of "tired," "delightful," "not motivated" and "rain" have been learned. Other mental and physical conditions have not been learned yet.

If the mental and physical condition of the user is a learned mental and physical condition, the content selector 88 selects content as described below.

1. The content selector 88 reads the attribute corresponding to the mental and physical condition of the user from the learning table 95b.

2. The content selector 88 refers to the content management table 93 and selects, from respective genres, content having the attribute read from the learning table 95b from those contents of a media type playable by the terminal 20, and obtains the file name of the selected content.

3. In step 2 above, contents not delivered yet are given priority in selection.

4. The content is selected so that the total memory size of the content fits within the remaining capacity of the storage medium of the terminal 20.

The output unit 90 reads from the body of content 96 the content with the file name selected by the content selector 88 and transmits the same to the terminal 20 via the communicator 82. Associated with this, the controller 98 causes the delivery history included in the content management table 93 to be updated. This completes the process related to the current delivery request.

If the mental and physical condition of the user is a mental and physical condition not learned, the content selector 88 selects content in cooperation with the accepting unit 94 as described below.

1. The content selector 88 reads the attribute corresponding to the mental and physical condition of the user from the general tendency table 94.

2. The content selector 88 refers to the content management table 93 and selects, from respective genres, content having the attribute read from the general tendency table 94 from those contents of a media type playable by the terminal 20. The content selector 88 obtains the file name of the selected content and outputs the file name to the accepting unit 84. Since the general tendency table 94 also contains the second most suitable attribute for a given mental and physical condition, a larger number of contents are selected than when selection is made by referring to the learning table 95b. In this case, too, contents not delivered yet are given priority in selection.

3. The accepting unit 84 reads, from the body of content 96, contents corresponding to the file names output from the content selector 88, generates digests of the contents and transmits the digests to the terminal 20. Upon receipt of information indicating a digest selected by the user from the terminal 20, the accepting unit 84 outputs the information to the content selector 88.

If the user's selection transmitted from the terminal 20 after transmitting digests to the terminal 20 indicates that the user does not want any content represented by the digests, the accepting unit 84 may allow the user to select at will a desired content from the entire contents stored in the storage 92 of the home server 80. For example, the process involves displaying a list of contents and playback of samples. The accepting unit 84 outputs information identifying the content selected by the user to the content selector 88.

4. The content selector 88 receives the information from the accepting unit 84 and obtains the file name of the content indicated by the information.

5. Finally, the content selector 88 refers to the content management table 93 using all the file names obtained as keys and determines whether the total memory size of the contents fits within the remaining capacity of the storage medium of the terminal 20. The content selector 88 may control the size, discarding some of the content as required.

The content selector 88 transmits the file names of the contents thus selected to the output unit 90.

The output unit 90 reads the contents with the file names output from the content selector 88 and transmits the contents to the terminal 20 via the communicator 82. Associated with the output from the output unit 90, the controller 98 causes the storage 92 to update the content management table 93. More specifically, the delivery history included in the content management table 93 is updated. The controller 98 causes the storage 92 to update the learning table 95$b$. More specifically, the controller 98 causes the storage 92 to associate the attribute of the content delivered currently with the current mental and physical condition and appends the association to the learning table 95$b$. This completes the process related to the current delivery request.

A comparison will now be made between the general tendency table 94 shown in FIG. 7 and the learning table 95$b$ shown in FIG. 8. The general tendency table 94 lists two attributes "relaxing" and "nostalgic" in association with "rain," indicating that a relaxing content is most suitable on a rainy day, followed by a nostalgic content. The learning table 95$b$ lists an attribute "nostalgic" in association with "rain," indicating that the user of the terminal 20 selected a nostalgic content on a rainy day.

Figure 9:
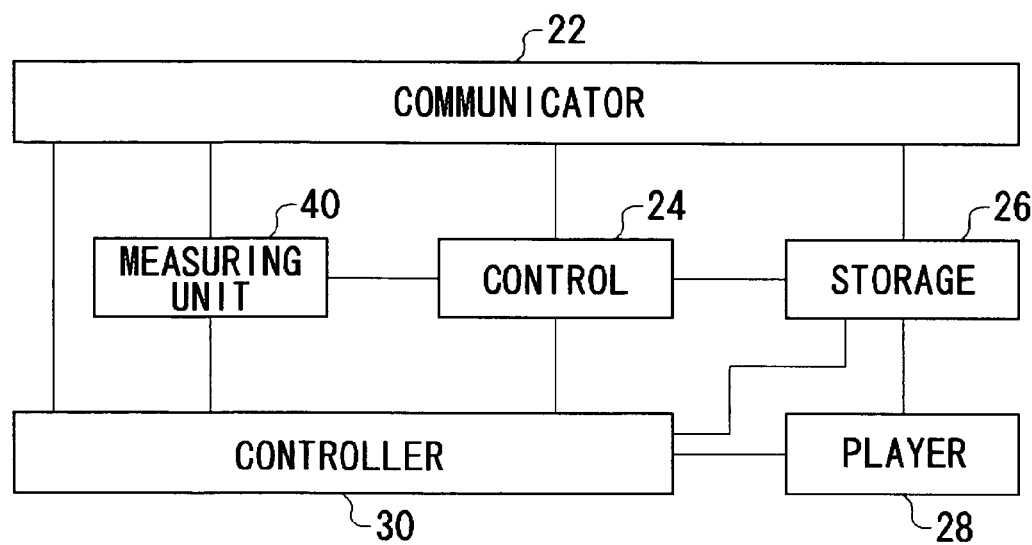
FIG. 9 shows the structure of a terminal in the delivery system shown in FIG. 1.

FIG. 9 shows the structure of the terminal 20. As mentioned before, the terminal 20 is represented by a cell phone and is provided with a communicator 22, a control 24, a storage 26, a player 28, a measuring unit 40 and a controller 30 for controlling these.

The communicator 22 is for communicating with the home server 80 and is provided with a LAN interface compatible with the communicator 82 of the home server 80.

The control 24 allows the user to provide various inputs. For example, the control 24 may be implemented by a numerical keypad of a cell phone, a controller of a game device, or a keyboard or a touch panel of a PDA.

The storage 26 is a storage medium for storing contents delivered from the home server 80. In a system that plays back a delivered content on a real time basis, a main memory may represent the storage 26. In a system that stores a delivered content for later playback, a hard disk or a memory card may represents the storage 26.

The player 28 may be represented by a monitor, a speaker or an earphone which plays back the content stored in the storage 26.

The measuring unit 40 is a sensor which measures primary data (e.g., the pulse rate, body temperature and ambient humidity) related to the mental and physical condition of the user of the terminal 20 occurring when a delivery request occurs. The measuring unit 40 is provided in the terminal 20 using components inherently provided in the terminal 20. For example, assuming that the terminal 20 is a portable gaming device, a pulse sensor and a body temperature sensor may be built in a cushion of an earphone that rests on the ears so that the sensors come into close contact with the body when the earphone is used. A humidity sensor may be attached to the underside of the controller which represents the control 24 or else the side thereof.

By providing the measuring unit 40 in the terminal 20 using components that are inherently provided in the terminal 20, the user need not take the trouble of wearing a measuring device to receive delivery. The aforementioned approach is advantageously used by the user since it enables obtaining measurement data without bothering the user.

The measuring unit 40 may be separate from the terminal 20 and may be connected to the terminal 20 using, for example, the USB interface of the terminal 20, when the user requests content delivery, so that the measurement data is transmitted to the home server 80 using the communicator 22 of the terminal 20. Alternatively, the terminal 20 upon connection to the home server 80 may transmit a trigger signal to the measuring unit 40 provided with a communicating means, by using, for example, a wireless communication means. The measuring unit 40 may take measurements in synchronization with the trigger signal from the terminal 20 and transmit the measurement data to the home server 80 using the communicating means provided in the measuring unit 40.

The measuring unit 40 and the terminal 20 may be integrated. For example, a hand band with a built-in sensor for measuring the pulse rate and body temperature may be fixedly attached to the terminal 20 as part of the terminal 20. The terminal 20, upon connection to the home server 80, may start taking measurements by the hand band so as to transmit measurement results to the home server 80.

The user connects the terminal 20 to the network 50 by using the communicator 22 and requests delivery by using the control 24 to connect to the home server 80. Connection to the home server 80 may be effected by designating an icon of the home server 80 that appears as a node on a network displayed on the screen of the terminal 20, or by depressing a predetermined button of the control 24. Any type of manipulation capable of connecting the terminal 20 to the home server 80 in the delivery system 100 serves the purpose. In synchronization with the connection, the controller 30 of the terminal 20 transmits the remaining capacity of the storage 26 of the terminal 20 and the machine type information of the terminal 20 to the home server 80. The measuring unit 40 measures the user's pulse rate, the user's body temperature and ambient humidity and sends this information to the home server 80. As the accepting unit 84 of the home server 80 presents a selection screen shown in FIG. 3 in response to the delivery request, the user manipulates the control 24 to enter selection as to whether to input the mental and physical condition. Upon selecting "input," the user inputs the mental and physical condition. The communicator 22 transmits the user's input to the home server 80. As the content delivered from the home server 80 is stored in the storage 26, the process in the terminal 20 is completed. When a need occurs to let the user select a desired content while the content selector 88 of the home server 80 is selecting content, the player 28 plays back digests transmitted from the accepting unit 84 of the home server 80 so that the user uses the control 24 to select a desired content. The process for transmitting the user input to the home server 80, the measuring process by the measuring unit 40, the process in the player 28 and the process in the storage 26 are performed under the control of the controller 30.

Figure 10:
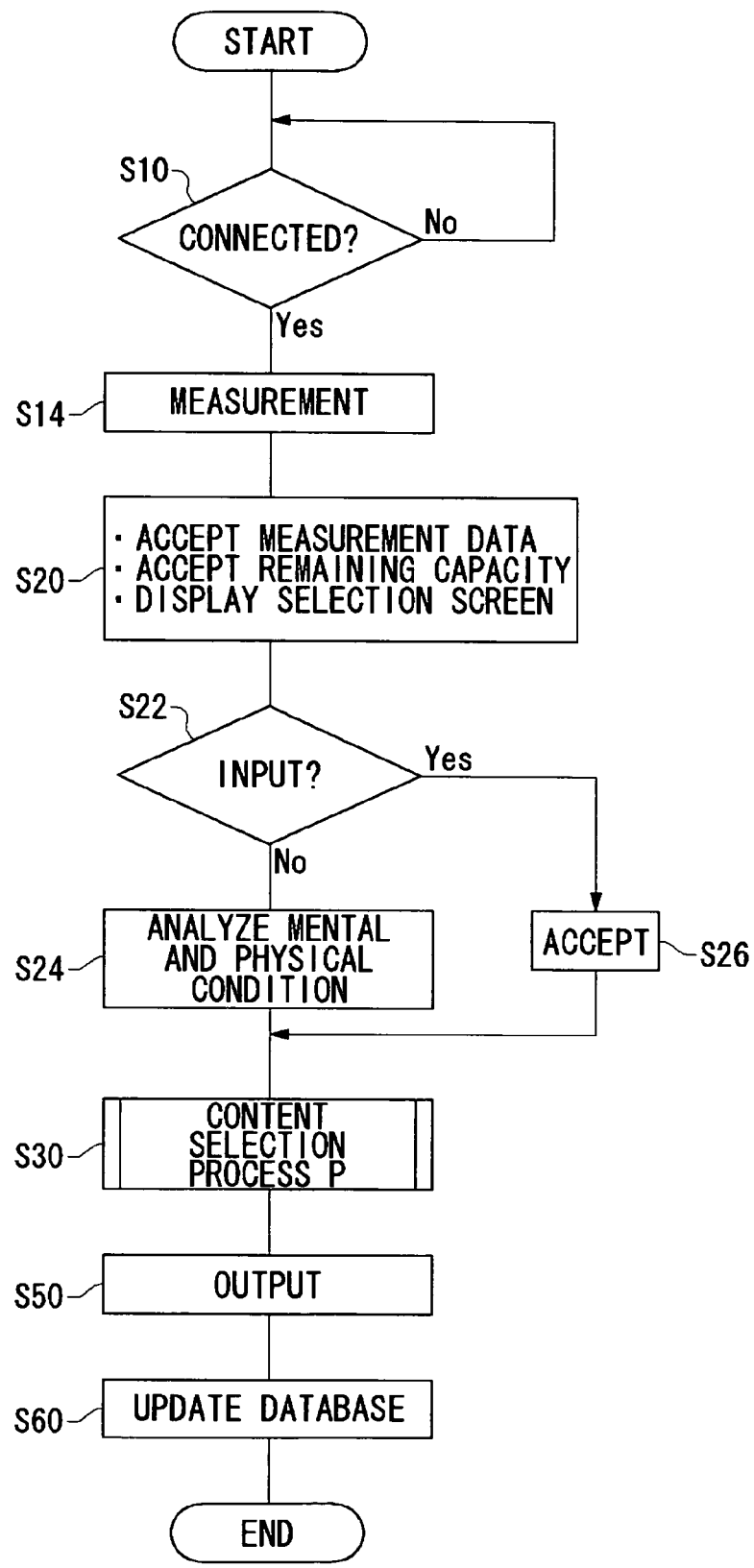
FIG. 10 is a flowchart showing a process performed by the homer server shown in FIG. 2.
Figure 11:
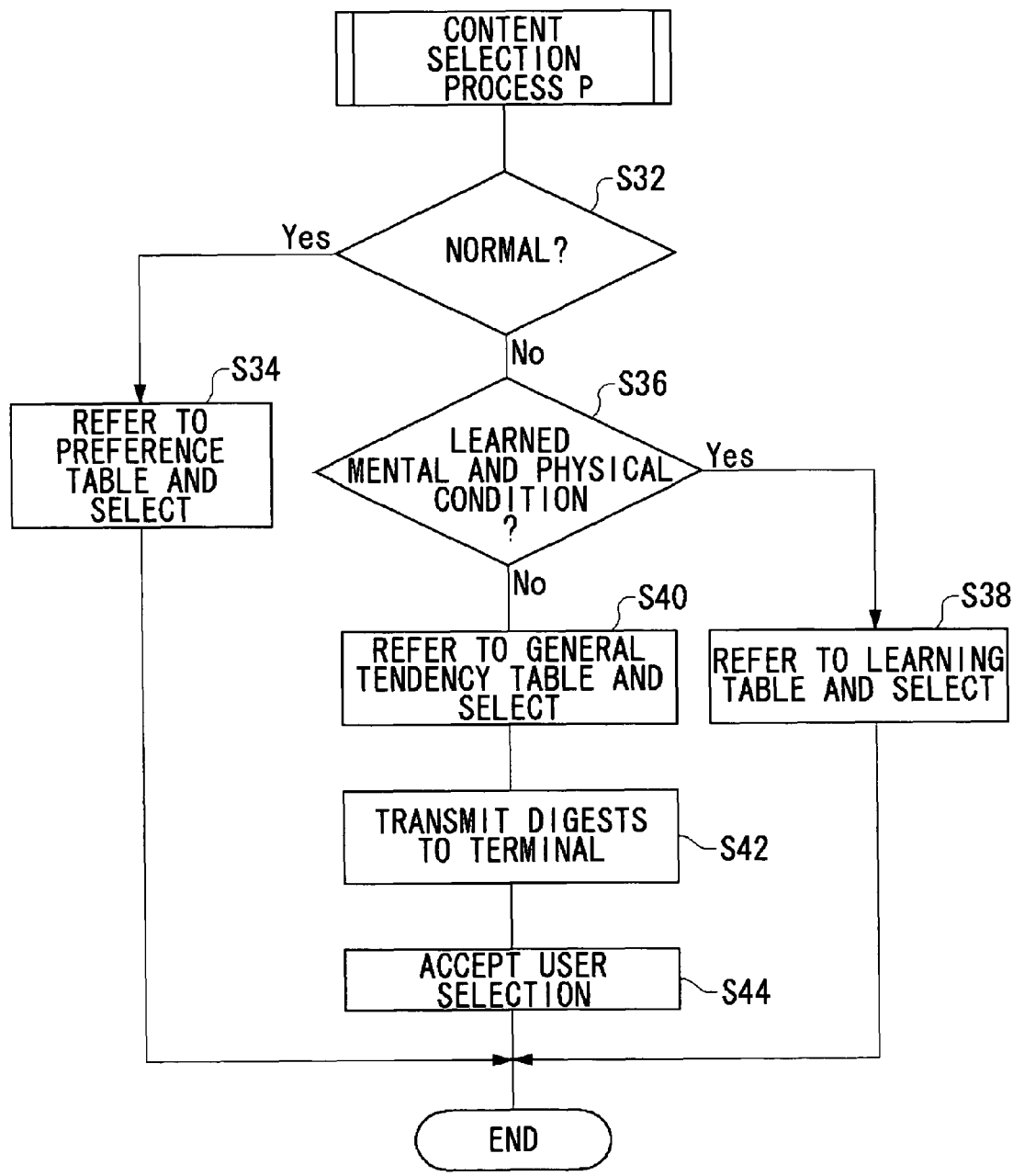
FIG. 11 is a flowchart showing a process performed by the homer server shown in FIG. 2.

FIGS. 10 and 11 are flowcharts showing an example of a process in the delivery system 100. It will be assumed that it is Monday morning and the user connects to the network 50, minding the time to go out to work. The user connects the terminal 20 to the home server 80 by using the control 24 of the terminal 20 to select the home server 80 located in the network (S10). Once the connection is established, the controller 30 of the terminal 20 initiates the measurement of the user's pulse rate, the user's body temperature and humidity. In this case, it will be assumed that the pulse sensor and the body temperature sensor are built in the earphone. The controller 30 determines whether the earphone is attached to the terminal 20. If not, the controller may prompt the user to attach the earphone. It may be possible that the earphone is attached to the terminal 20 but is not worn by the user. Therefore, the controller 30 examines the measurement data and prompts the user to wear the earphone and initiates re-measurement, if the pulse rate or the body temperature is outside a possible range.

The terminal 20 transmits the machine type information and the remaining capacity of the storage medium of the terminal 20 to the home server 80 along with the measurement data obtained by the sensors. Upon receipt of the measurement data, the remaining capacity and the machine type information from the terminal 20, the accepting unit 84 of the home server 80 outputs the measurement data to the mental and physical condition analyzer 86 and outputs the remaining capacity and the machine type information to the content selector 88. In addition to this, the accepting unit 84 presents a screen shown in FIG. 3 to the user via the terminal 20 so as to allow the user to select whether to input the mental and physical condition (S20, S22). If the user selects "input," the accepting unit 84 outputs the mental and physical condition input by the user to the content selector 88 (S22: Yes, S26). Conversely, if the user selects "not input," the accepting unit 84 no longer shows the screen of FIG. 3 and proceeds to analysis of the mental and physical condition by the mental and physical condition analyzer 86 (S22: No, S24). At this point in time, the user may leave where he or she was for a meal or to get ready to go to work.

When the mental and physical condition is entered by the user, or when the mental and physical condition analyzer 86 analyzes the mental and physical condition based upon the measurement data and the date and time of the delivery request, the content selector 88 performs a content selection process P in accordance with the user's mental and physical condition (S30).

FIG. 11 is a flowchart showing the details of the content selection process P. Initially, the content selector 88 determines whether the user's mental and physical condition is "normal" (S32). It will be assumed by way of example that the user selects "not input" in step S22, the pulse rate and body temperature included in the measurement data are normal and the humidity is 40%. It is Monday morning and the user is determined to be "not motivated" as a result of the analysis. Since the user's mental and physical condition is not "normal" (S32: No), the content selector 88 proceeds to refer to the learning table 95*b* and determines whether the mental and physical condition has been learned (S36). The mental and physical condition of "not motivated" is linked with the attribute "motivating" in the storage. The content selector 88 refers to the content management table 93 so as to select content having the attribute "motivating" from those contents of a media type playable by the terminal 20, the media type being determined based upon the machine type information of the terminal 20. The content selector 88 obtains the file name of the selected content and transmits the same to the output unit 90 (S36: Yes, S38), whereupon the content selection process P is terminated.

Conversely, if the user's mental and physical condition has not been learned, the content selector 88 reads the attribute corresponding to the user's mental and physical condition from the general tendency table 94. The content selector 88 then refers to the content management table 93 so as to select content having the attribute thus read from those contents of a media type playable by the terminal 20, obtains the file name of the selected content and transmits the file name to the accepting unit 84 (S36: No, S40). The accepting unit 84 reads the contents corresponding to these file names, generates digests of the contents and transmits the digests to the terminal 20. The accepting unit 84 then outputs information indicating content selected by the user to the content selector 88 (S42). Since this necessitates selection by the user, audio output may be employed to prompt the user for input. The content selector 88 transmits the file name of the content that the user selected to the output unit 90, whereupon the content selection process P is terminated (S44).

Assuming instead that it is nine o'clock on a weekday evening and not Monday morning, the user's mental and condition would be "normal" (S32: Yes). In this case, the content selector 88 refers to the preference table 95*a* so as to select content of the genre preferred by the user. In the example shown in FIG. 8, the genre preferred by the user is "classical" and "movie" so that content is selected from these two genres.

Returning to the flowchart of FIG. 10, the output unit 90 reads, from the body of content 96, the content with the file name transmitted from the content selector 88 and transmits the same to the terminal 20 (S50). The controller 98 causes the storage 92 to update the databases stored in the storage 92 as required. As the update is completed, the process for the current delivery is terminated (S60).

The terminal 20 stores the delivered content in the storage 26. In the case of the user described above, the content with the "motivating" attribute is stored in the storage 26 of the terminal 20 while the user is having a meal or getting ready to go out. The user can enjoy the content on the way to work.

As described, the delivery system 100 according to the embodiment is configured such that the home server 80 obtains the user's mental and physical condition when there is a delivery request from the terminal 20 and delivers a suitable content accordingly. In this way, contents adapted to the user's condition can be delivered.

Moreover, the tendency with which the user prefers a particular content in a particular mental and physical condition is learned and delivery is made in accordance with the tendency. Therefore, delivery suitable to the user's preference is achieved.

If the user's preference has not been learned, contents are selected based upon the general tendency so as to prompt for the user's selection. This saves a considerable amount of time and trouble required to search for a desired content from a large amount of contents. Therefore, easy and efficient selection of a desired content is achieved.

The content is selected so that the total size fits within the remaining capacity of the storage medium of the terminal 20. Therefore, freeze of the apparatus or abnormal termination due to delivery of contents in excess of the remaining capacity of the storage medium of the terminal 20 are prevented.

Since the content is selected from those contents of a media type playable by the terminal 20, delivery of contents adapted to the mental and physical condition but not playable by the terminal 20 is prevented.

Described above is an illustrative embodiment of the present invention. Various variations, additions, downscaling and modifications of details may be practiced.

For example, information indicating the total playback time desired by the user may be transmitted to the home server 80 in association with a delivery request. Allowing the home server 80 to select and deliver content adapted to the total playback time serves needs such as those for delivery of content of a playback time compatible with one-hour commuting time. The term "compatible" refers not only to a case where the playback time completely matches the total playback time desired by the user. What is essential is that the condition or playback time (e.g., the playback time does not exceed the desired total playback time) is fulfilled. For example, content with a playback time of "within an hour" may be delivered for playback during one-hour commuting time.

The delivery system 100 as described above is a system in which the home server 80 within the user's home delivers content to the user's terminal 20. The present invention may also be applied to a system in which a delivery site on a wide area network (WAN) represented by the Internet delivers contents to a large number of users. In this case, user tables and delivery histories may be maintained for respective users.

The machine type information of the terminal 20 is described as being automatically transmitted as information indicating the media type of the content. Alternatively, the machine type information may be manually entered by the user. In this case, the desired media type of contents may be entered directly.

While the home server 80 of the delivery system 100 as described is configured to select content from the genres, the system may allow the user to enter a desired genre and select content from those contents of the input genre.

The delivery system 100 is configured such that the terminal 20 transmits measurement data so that the home server 80 estimates the user's mental and physical condition by referring to the measurement data and the date and time of the delivery. Alternatively, the terminal 20 may analyze the measurement data and transmits the result to the home server 80. In view of the improvement in the functions of a cell phone in recent years, the cell phone may be provided with a scheduling function so that the mental and physical condition may be estimated in the cell phone based upon the date and time of the delivery.

The types of mental and physical condition dealt with are not limited to those as those described above. Any condition that indicates the physical condition or the mental condition of the user may be dealt with by the present invention.

Of course, the types of analyzed information may not be limited to those given as examples. For example, a system which delivers from a delivery site on the Internet to the user may allow the user to input information indicating the category of location such as "quiet place," "crowded place," "amusement park" and "grassy field," so that content adapted to the mental and physical condition corresponding to the category of the location may be delivered.

The user's location may be identified by referring to Global Positioning System (GPS) information obtained by a GPS function provided in the terminal. For example, a means may be provided for accessing a map database on a network so that the map database is searched using a geographical position indicated by the GPS information from the terminal. If an amusement park is identified at the geographical position indicated by the GPS information, the user's location is identified to be the "amusement park." The content delivery apparatus itself may be provided with a map database.

The information on the location may be used not only to deliver content adapted to the user's mental and physical condition but also for delivering content such as information related to the location in accordance with the geographical position of the location.

The invention claimed is:

1. A content delivery apparatus, comprising:
   a storage unit, including:
     a content management database which stores a plurality of contents in association with a plurality of attributes such that a given one of the plurality of contents is associated with at least one of the plurality of attributes as determined by a plurality of users of that content,
     a general tendency database which stores a plurality of user conditions in association with the plurality of attributes such that a given one of the plurality of user conditions is associated with at least one of the plurality of attributes, the given one of the plurality of user conditions being at least one of a physical condition or a mental condition, and
     a learning database which stores a further plurality of contents that was previously delivered to a particular terminal and, for each one of the plurality of previously delivered contents, a condition of a user of that terminal at the time that the content was delivered;
   user condition information obtaining means which, in response to a delivery request received from the particular terminal, obtains information indicating a determined current condition of the user of the particular terminal based on at least one of (a) information entered into the particular terminal by the user or (b) current measurement data regarding the user;
   content selection means which refers to the information indicating the determined current user condition, and in response to determining that the determined current user condition is stored in the learning database, refers to the learning database to select a particular one of the plurality of previously delivered contents based on the determined current user condition, and in response to determining that the determined current user condition is not stored in the learning database, refers to the general tendency database to select a particular one of the plurality of attributes that is associated with the determined current user condition and refers to the content management database to select a particular one of the plurality of contents that is associated with the particular one of plurality of attributes; and
   delivery means which delivers the selected content to the particular terminal.

2. The content delivery apparatus according to claim 1, wherein the user condition information obtaining means includes:
   primary data accepting means which receives primary data related to the condition of the user transmitted from the terminal; and
   analyzing means which analyzes the received primary data so as to obtain the information indicating the determined current user condition.

3. The content delivery apparatus according to claim 1, wherein the user condition information obtaining means includes:
   date, time and condition correspondence storage means which stores one or more given dates and times in association with conditions that people generally experience at that date and time; and
   estimation means which detects the condition corresponding to a date and a time of the delivery request from the date, time and condition correspondence storage means and estimates the condition of the user at the date and the time of the delivery request.

4. The content delivery apparatus according to claim 1, wherein the user condition information obtaining means includes:
event storage means which stores one or more given dates and times in association with one or more events corresponding to that date and time; and
estimation means which detects an event corresponding to a date and a time of the delivery request from the event storage means and estimates the condition of the user based upon the detected event.

5. The content delivery apparatus according to claim 1, further comprising remaining capacity information accepting means which receives from the terminal remaining capacity information indicating a remaining storage capacity of the terminal, wherein the content selection means selects content having a total size which fits within the remaining storage capacity.

6. The content delivery apparatus according to claim 1, further comprising delivery history storage means which stores a history of content delivery for the user, wherein the content selection means refers to the stored content delivery history and selects content such that priority is given to content not yet delivered to the user.

7. The content delivery apparatus according to claim 1, further comprising total playback time accepting means which receives from the terminal total playback time information designating a total time to play back content, wherein the content selection means selects content so that the total time required for content playback is compatible with the total time to play back content designated by the total playback time information.

8. A content delivery apparatus, comprising:
content selection means which selects content in response to a delivery request from a terminal;
delivery means which delivers the selected content to the terminal;
a database which stores a plurality of contents in association with a plurality of properties that people who enjoy the contents generally associate with the contents such that a given one of the plurality of contents is associated with at least one of the plurality of properties;
user condition information obtaining means which obtains information indicating a determined current condition of a user of the terminal that is based on at least one of (a) information entered into the terminal by the user or (b) current measurement data regarding the user, the information indicating the determined current user condition being associated with the delivery request; and
learning means which stores, in association with the properties of the selected contents delivered by the delivery means, the obtained information indicating the determined current user condition,
the content selection means, in response to a delivery request associated with information indicating the determined current user condition that was not previously stored in relation to the user of the terminal, accepting content designation information entered by the user of the terminal and selecting the content designated by the content designation information, and in response to a delivery request corresponding to the information indicating the determined current user condition that is already stored by the learning means in relation to the user of the terminal, selecting from the database content having a property corresponding to the condition of the user as indicated by the information indicating the determined current user condition that is stored in the learning means.

9. The content delivery apparatus according to claim 8, wherein the user condition information obtaining means includes:
primary data accepting means which receives primary data related to the condition of the user transmitted from the terminal; and
analyzing means which analyzes the received primary data so as to obtain the information indicating the determined current user condition.

10. The content delivery apparatus according to claim 8, wherein the user condition information obtaining means includes:
date, time and condition correspondence storage means which stores one or more given dates and times in association with one or more conditions that people generally experience at that date and time; and
estimation means which detects the condition corresponding to a date and a time of the delivery request from the date, time and condition correspondence storage means and estimates the condition of the user at the date and the time of the delivery request.

11. The content delivery apparatus according to claim 8, wherein the user condition information obtaining means includes:
event storage means which stores one or more given dates and times in association with one or more events corresponding to that date and time; and
estimation means which detects an event corresponding to a date and a time of the delivery request from the event storage means and estimates the condition of the user based upon the detected event.

12. The content delivery apparatus according to claim 8, further comprising remaining capacity information accepting means which receives from the terminal remaining capacity information indicating a remaining storage capacity of the terminal, wherein the content selection means selects content having a total size which fits within the remaining storage capacity.

13. The content delivery apparatus according to claim 8, further comprising delivery history storage means which stores a history of content delivery for the user, wherein the content selection means refers to the stored content delivery history and selects content such that priority is given to content not yet delivered to the user.

14. The content delivery apparatus according to claim 8, further comprising total playback time accepting means which receives from the terminal total playback time information designating a total time to play back content, wherein the content selection means selects content so that the total time required for content playback is compatible with the total time to play back content designated by the total playback time information.

15. A content delivery system, comprising:
a terminal;
a content delivery apparatus which delivers content to the terminal in response to a delivery request received from the terminal;
a storage unit, including:
a content management database which stores a plurality of contents in association with a plurality of attributes such that a given one of the plurality of contents is associated with at least one of the plurality of attributes as determined by a plurality of users of that content, a general tendency database which stores a plurality of user conditions in association with the plurality of attributes such that a given one of the plurality of user conditions is associated with at least one of the plurality of attributes, the given one of the plurality of user conditions being at least one of a physical condition or a mental condition, and a learning database which stores a further plurality of contents that was previously delivered to the terminal and, for each one of the plurality of previously delivered contents, a condition of a user of the terminal at the time that the content was delivered; and a user condition information obtaining apparatus which, in response to the received delivery request, obtains information indicating a determined current condition of the user of the terminal based on at least one of (a) information entered into the terminal by the user or (b) current measurement data regarding the user, and transmits the obtained information indicating the determined current user condition to the content delivery apparatus, the content delivery apparatus referring to the information indicating the determined current user condition, and in response to determining that the determined current user condition is stored in the learning database, refers to the learning database to select a particular one of the plurality of previously delivered contents based on the determined current user condition, and in response to determining that the determined current user condition is not stored in the learning database, refers to the general tendency database to select a particular one of the plurality of attributes that is associated with the determined current user condition and refers to the content management database to select a particular one of the plurality of contents that is associated with the particular one of plurality of attributes.

16. The content delivery system according to claim 15, wherein the user condition information obtaining apparatus is integrated with the terminal.

17. The content delivery system according to claim 15, wherein the user condition information obtaining apparatus is formed from components inherently provided in the terminal.

18. The content delivery system according to claim 15, wherein the user condition information obtaining apparatus includes:
  primary data measuring means which measures primary data related to the condition of the user; and
  analyzing means which analyzes the primary data so as to obtain the information indicating the determined current user condition and transmit the obtained information to the content delivery apparatus.

19. The content delivery system according to claim 15, wherein the user condition information obtaining apparatus includes:
  primary data measuring means which measures primary data related to the condition of the user, the primary data measuring means being formed from components inherently provided in the terminal; and
  analyzing means which analyzes the primary data so as to obtain the information indicating the determined current user condition and transmits the obtained information to the content delivery apparatus, the analyzing means being included in the terminal.

20. The content delivery system according to claim 15, wherein the user condition information obtaining apparatus includes:
  event storage means which stores personal events of a user; and
  estimation means which detects an event corresponding to a date and a time of the delivery request from the event storage means and estimates the condition of the user based upon the detected event.

* * * * *